United States Patent
Frey et al.

(10) Patent No.: US 11,391,161 B2
(45) Date of Patent: Jul. 19, 2022

(54) COMPONENT FOR A TURBINE ENGINE WITH A COOLING HOLE

(71) Applicant: GENERAL ELECTRIC COMPANY, Schenectady, NY (US)

(72) Inventors: David Alan Frey, West Chester, OH (US); Kirk D. Gallier, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 597 days.

(21) Appl. No.: 16/039,646

(22) Filed: Jul. 19, 2018

(65) Prior Publication Data
US 2020/0024965 A1  Jan. 23, 2020

(51) Int. Cl.
*F01D 5/18* (2006.01)
*F01D 25/12* (2006.01)

(52) U.S. Cl.
CPC ............. *F01D 5/187* (2013.01); *F01D 25/12* (2013.01); *F05D 2240/11* (2013.01); *F05D 2240/128* (2013.01); *F05D 2240/30* (2013.01); *F05D 2240/35* (2013.01); *F05D 2260/201* (2013.01); *F05D 2260/202* (2013.01)

(58) Field of Classification Search
CPC ............ F23R 3/002; F23R 2900/03044; F01D 5/187; F01D 5/188; F01D 5/189; F01D 5/12; F01D 5/181; F01D 5/182; F01D 5/183; F01D 5/184; F01D 5/186; F01D 25/12; F05D 2260/201
See application file for complete search history.

(56) References Cited

U.S. PATENT DOCUMENTS

| | | | |
|---|---|---|---|
| 5,352,091 A * | 10/1994 | Sylvestro | F01D 5/189 416/96 A |
| 5,533,864 A | 7/1996 | Nomoto et al. | |
| 6,551,062 B2 | 4/2003 | Leeke et al. | |
| 6,634,859 B2 | 10/2003 | Weigand et al. | |
| 7,815,414 B2 | 10/2010 | Devore et al. | |
| 8,961,111 B2 * | 2/2015 | Benson | F01D 5/187 415/121.2 |
| 9,234,438 B2 | 1/2016 | Lee | |
| 9,366,143 B2 | 6/2016 | Lee et al. | |
| 9,394,796 B2 | 7/2016 | Lacy et al. | |
| 9,447,692 B1 | 9/2016 | Liang | |
| 9,777,577 B2 | 10/2017 | Brandi et al. | |
| 2006/0269410 A1 | 11/2006 | Downs et al. | |
| 2010/0000200 A1 * | 1/2010 | Smith | F01D 5/186 60/266 |

(Continued)

*Primary Examiner* — Jason H Duger
(74) *Attorney, Agent, or Firm* — McGarry Bair PC

(57) ABSTRACT

An apparatus and method relating an airfoil for a turbine engine with an outer wall bounding an interior and defining a pressure side and a suction side extending between a leading edge and a trailing edge to define a chord-wise direction and extending between a root and a tip to define a span-wise direction. The airfoil includes a first cooling passage extending in the span-wise direction within the interior and a second cooling passage defining an impingement surface and located proximate the first cooling passage, an interior wall separating the first cooling passage from the second cooling passage, and at least one cooling hole passing through the interior wall.

24 Claims, 7 Drawing Sheets

(56) References Cited

U.S. PATENT DOCUMENTS

| | | | |
|---|---|---|---|
| 2015/0004001 A1* | 1/2015 | Schnieder | F01D 5/187 416/97 R |
| 2015/0082808 A1* | 3/2015 | Crites | F01D 5/186 60/806 |
| 2018/0135519 A1* | 5/2018 | Fauner | F02C 3/04 |

* cited by examiner

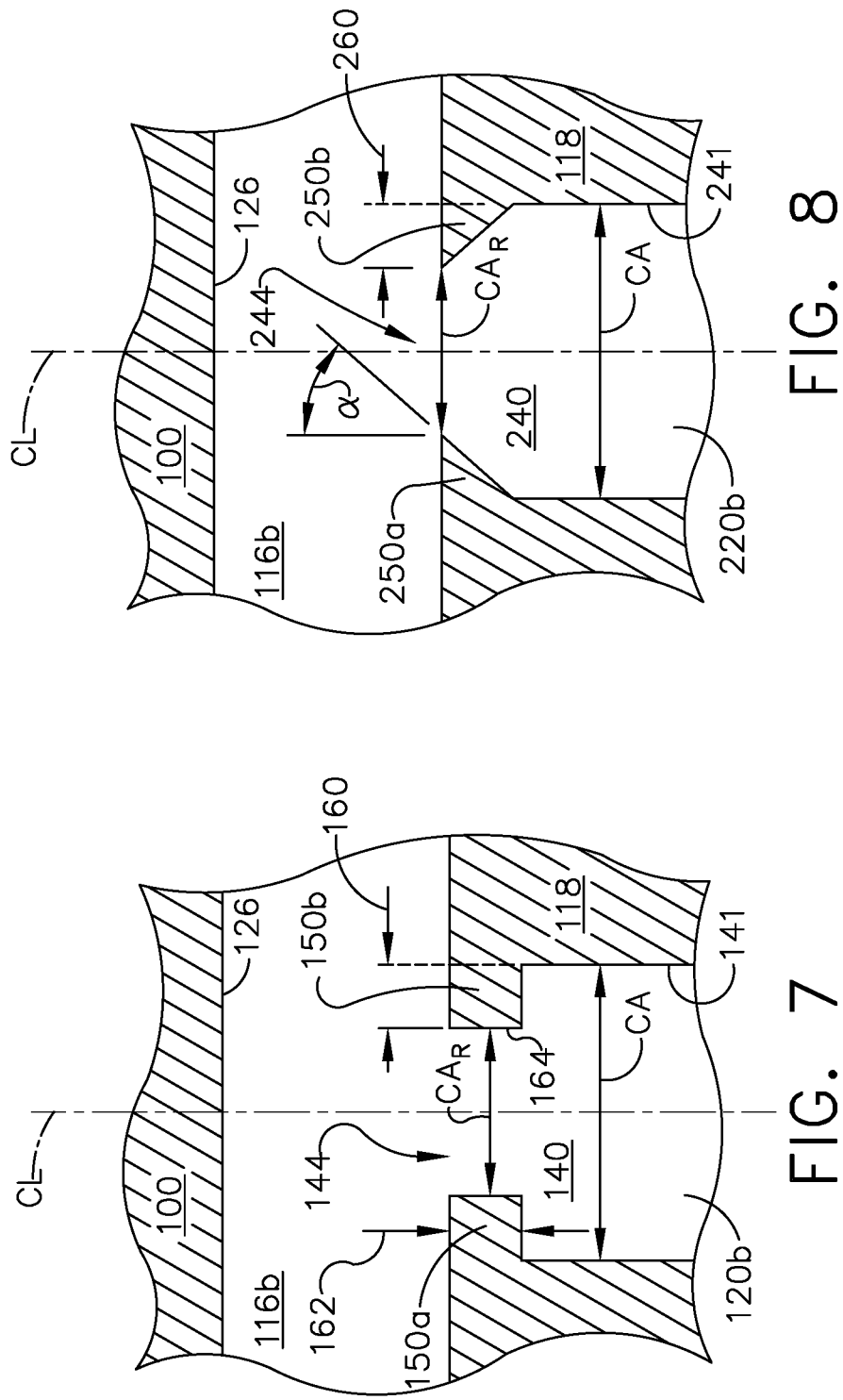

COMPONENT FOR A TURBINE ENGINE WITH A COOLING HOLE

BACKGROUND OF THE INVENTION

Turbine engines, and particularly gas or combustion turbine engines, are rotary engines that extract energy from a flow of combusted gases passing through the engine onto a multitude of rotating turbine blades.

Engine efficiency increases with temperature of combustion gases. However, the combustion gases heat the various components along their flow path, which in turn requires cooling thereof to achieve a long engine lifetime. Typically, the hot gas path components are cooled by bleeding air from the compressor. This cooling process reduces engine efficiency, as the bled air is not used in the combustion process.

Turbine engine cooling art is mature and is applied to various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary turbine engine components, thin metal walls of high strength super-alloy metals are typically used for enhanced durability while minimizing the need for cooling thereof. Various cooling circuits and features are tailored for these individual components in their corresponding environments in the engine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect the disclosure relates to an airfoil for a turbine engine, the airfoil comprising an outer wall bounding an interior and defining a pressure side and a suction side extending between a leading edge and a trailing edge to define a chord-wise direction and extending between a root and a tip to define a span-wise direction, a first cooling passage extending in the span-wise direction within the interior and defining a corner, a second cooling passage defining an impingement surface and located proximate the first cooling passage, an interior wall separating the first cooling passage from the second cooling passage, and at least one cooling hole passing through the interior wall and having an inlet at the corner, an outlet at the second cooling passage, and a connecting passage extending between the inlet and the outlet, with the connecting passage having a curve defined by at least a first portion extending in a first direction, and a second portion extending in a second direction, different from the first direction.

In another aspect the disclosure relates to a component for a turbine engine which generates a hot gas fluid flow, and provides a cooling fluid flow, component comprising a wall separating the hot gas fluid flow from the cooling fluid flow, forming an interior, and having a heated surface along which the hot gas fluid flow flows and a cooled surface facing the cooling fluid flow, a first cooling passage defining the cooled surface and formed within the interior and having a corner, a second cooling passage defining an impingement surface and located proximate the first cooling passage, an interior wall separating the first cooling passage from the second cooling passage, and at least one cooling hole passing through the interior wall and having an inlet at the corner, an outlet at the second cooling passage, and a connecting passage extending between the inlet and the outlet, with the connecting passage having a curve defined by at least a first portion extending in a first direction, and a second portion extending in a second direction, different from the first direction.

In yet another aspect, the disclosure relates to a method for cooling an engine component with an internal cooling passage and impingement cavity, the method comprising flowing a fluid through a cooling hole connecting the internal cooling passage and the impingement cavity by flowing the fluid through the cooling hole in a first direction and then in a second direction, which is different from the first direction, and accelerating the fluid as it passes through the cooling hole.

BRIEF DESCRIPTION OF THE DRAWINGS

In the drawings:

FIG. 7 is an enlarged cross-sectional view of the outlet for the internal cooling hole from FIG. 4 according to an aspect of the disclosure herein.

FIG. 8 is an enlarged cross-sectional view of the outlet for the internal cooling hole from FIG. 4 according to another aspect of the disclosure herein.

DESCRIPTION OF EMBODIMENTS OF THE INVENTION

Figure 1:
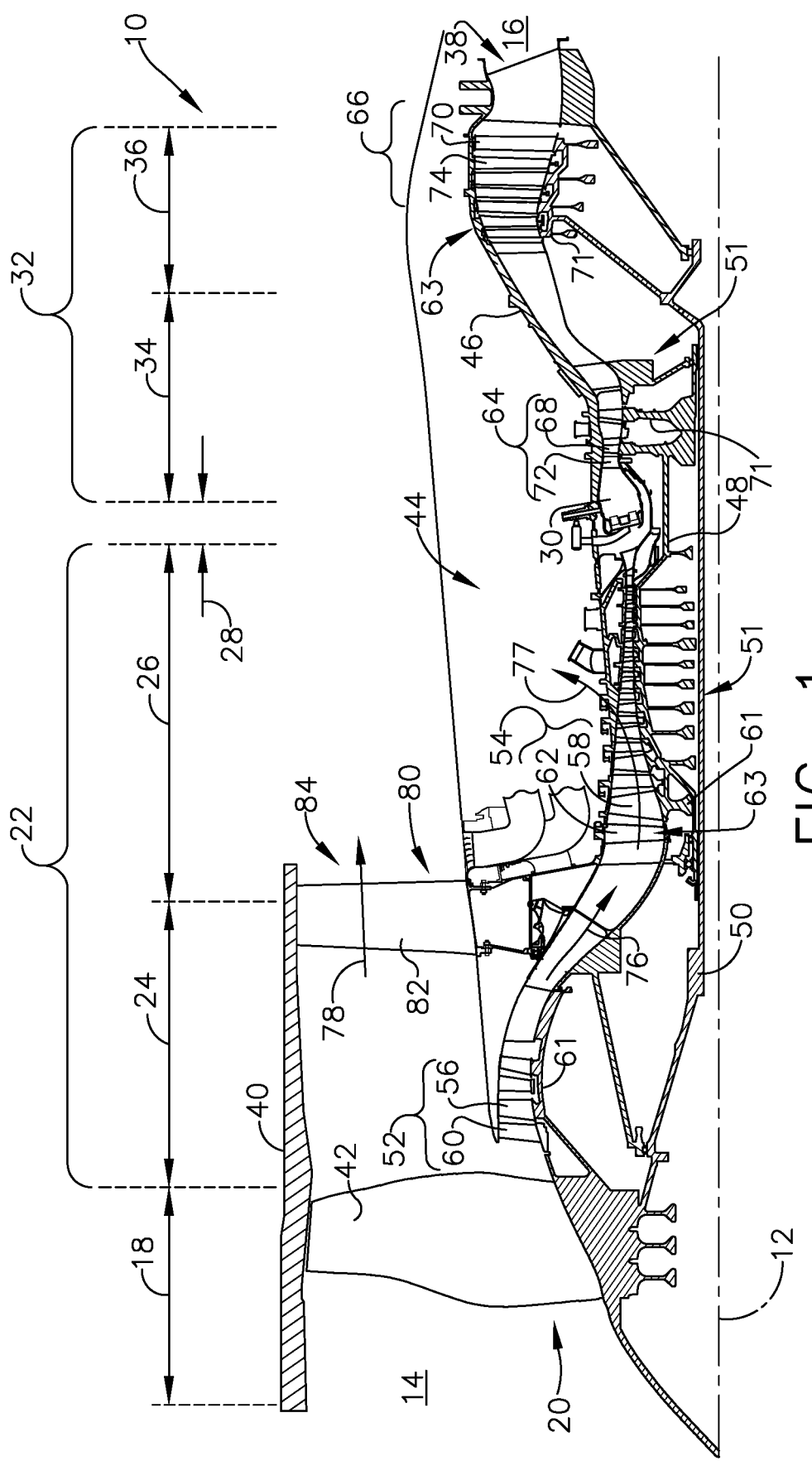
FIG. 1 is a schematic cross-sectional diagram of a turbine engine for an aircraft.

Aspects of the disclosure described herein are directed to the formation of a cooling hole specifically an internal cooling hole passing between two internal cooling passages. For purposes of illustration, the aspects of the disclosure discussed herein will be described with respect to cooling passages within an airfoil of a blade for a turbine engine. It will be understood, however, that the disclosure as discussed herein is not so limited and may have general applicability within other engine components, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. Furthermore it should be understood that the term cross section or cross-sectional as used herein is referring to a section taken orthogonal to the centerline and to the general coolant flow direction in the hole. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
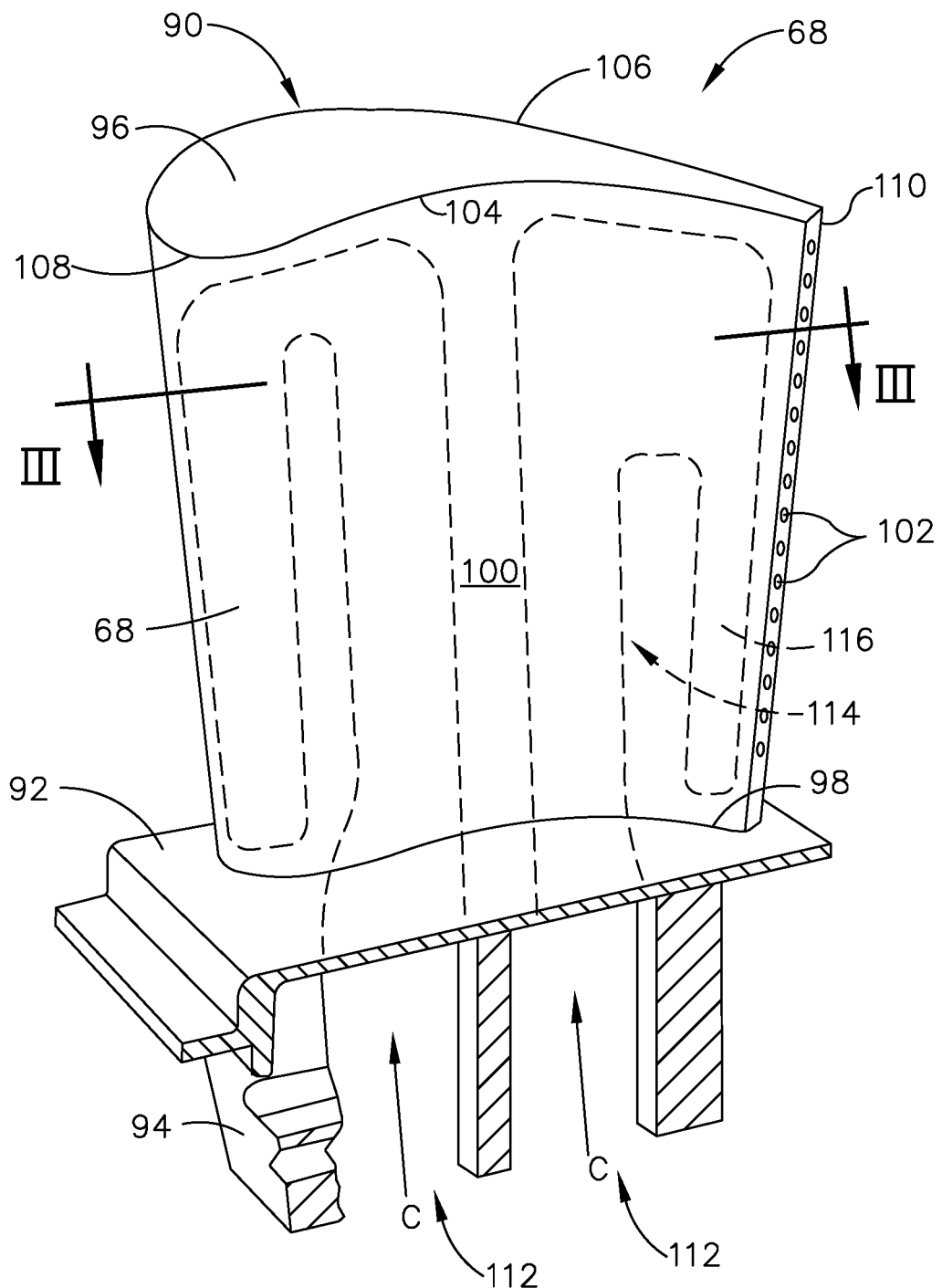
FIG. 2 is an isometric view of an airfoil for the turbine engine of FIG. 1 in the form of a blade and having internal cooling passages.

FIG. 2 is a perspective view of an example of an engine component illustrated as an airfoil 90, a platform 92, and a dovetail 94, which can be a rotating blade 68, as shown in FIG. 1. Alternatively, it is contemplated that the airfoil 90 can be a stationary vane, such as the vane 72 of FIG. 1, while any suitable engine component is contemplated. The airfoil 90 includes a tip 96 and a root 98, defining a span-wise direction there between. Additionally, the airfoil 90 includes an outer wall 100. A pressure side 104 and a suction side 106 are defined by the airfoil shape of the outer wall 100.

The airfoil 90 mounts to the platform 92 at the root 98. The platform 92 is shown in section and can be circumferentially assembled to form an annular band. It is also contemplated that the cross section is taken from a singular annular band for mounting a plurality of airfoils 90. The airfoil 90 can fasten to the platform 92, such as welding or mechanical fastening, or can be integral with the platform 92 in non-limiting examples. The airfoil 90 further includes a leading edge 108 and a trailing edge 110, defining a chord-wise direction. In an aspect of the disclosure herein, at least one cooling hole 102 is formed in the airfoil 90, the at least one cooling hole 102 can be formed in the trailing edge 110 as illustrated.

The dovetail 94 couples to the platform 92 opposite of the airfoil 90, and can be configured to mount to the disk 71, or rotor 51 of the engine 10 (FIG. 1), for example. In one alternative example, the platform 92 can be formed as part of the dovetail 94. The dovetail 94 can include one or more inlet passages 112, illustrated as two inlet passages 112 that are fluidly coupled to an interior 114 of the airfoil 90. At least one cooling passage 116 is provided within the interior 114. It is contemplated that the inlet passages 112 are fluidly coupled to the at least one cooling passage 116 to provide the cooling fluid flow (C) to the interior 114 of the airfoil 90 for cooling of the airfoil 90. It should be appreciated that the dovetail 94 is shown in cross-section, such that the inlet passages 112 are housed within the body of the dovetail 94.

It should be understood that while the description herein is related to an airfoil, it can have equal applicability in other engine components requiring cooling via cooling holes such as film cooling. One or more of the engine components of the engine 10 includes a film-cooled substrate, or wall, in which a film cooling hole, or hole, of the disclosure further herein may be provided. Some non-limiting examples of the engine component having a wall can include blades, vanes or nozzles, a combustor deflector, combustor liner, or a shroud assembly. Other non-limiting examples where film cooling is used include turbine transition ducts and exhaust nozzles.

Figure 3:
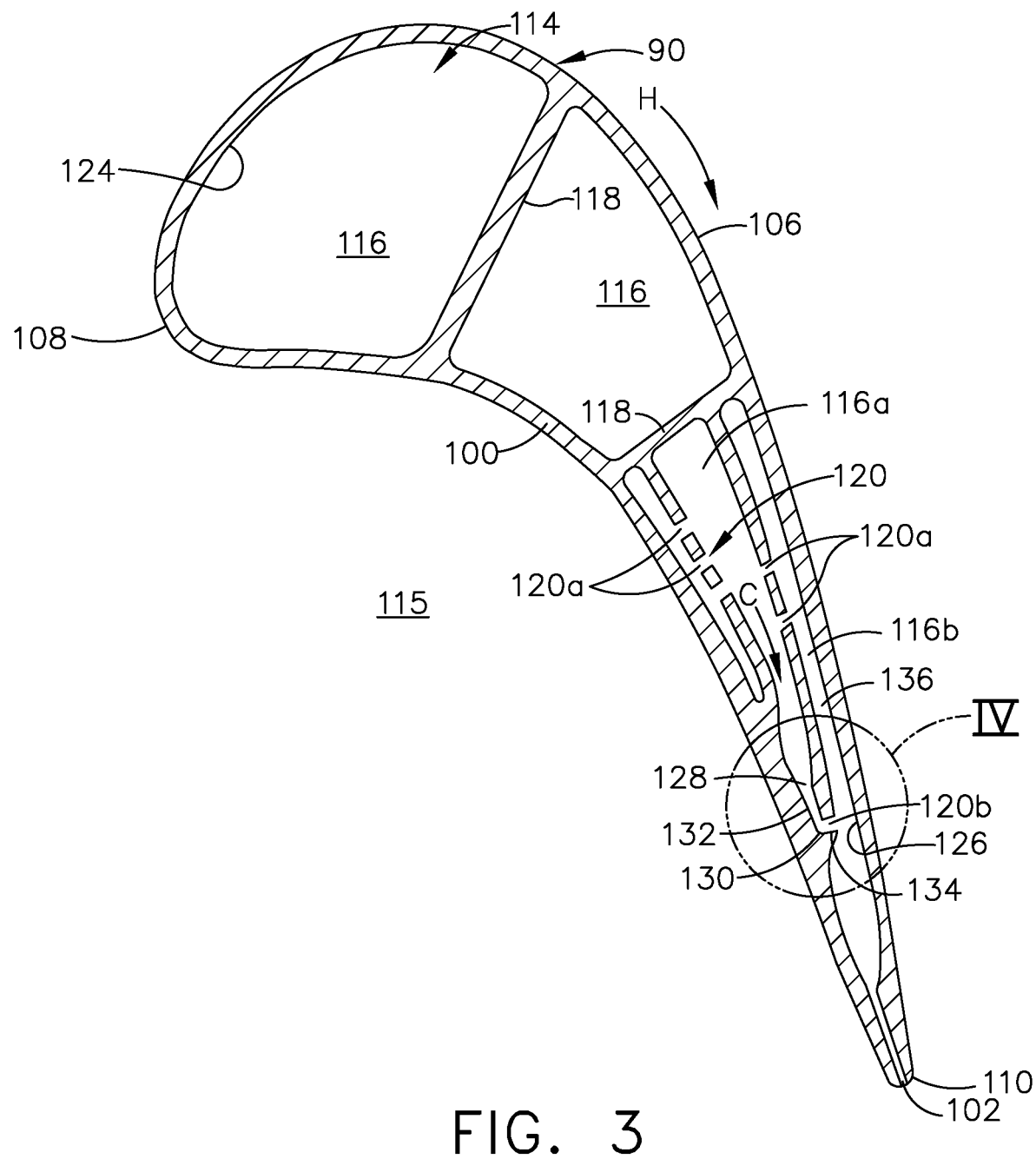
FIG. 3 is a cross-sectional view of the airfoil from FIG. 2 with internal cooling holes.

FIG. 3 is a cross-section taken along line of FIG. 2 showing the interior 114 of the airfoil 90 including the at least one cooling passage 116 illustrated as multiple cooling passages 116. The multiple cooling passages 116 can be separated by interior walls 118. Interior walls 118 can extend between the pressure and suction sides to form ribs as illustrated and in other non-limiting examples can be any wall within the airfoil 90 and defining at least a portion of the multiple cooling passages 116.

The outer wall 100 separates the interior 114 from a hot gas fluid flow (H) along an exterior, or heated surface 122 of the outer wall 100 from a cooling fluid flow along an interior, or cooled surface 124 of the outer wall 100. Together the outer wall 100 and interior walls 118 can define the cooled surface 124 of the at least one cooling passages 116. In some aspect of the disclosure herein, pin fins, dimples, turbulators, or any other type of flow enhancer can be provided along the interior, or cooled surface 124 to enhance cooling effectiveness within the interior 114 of the airfoil 90. The at least one cooling hole 102 can be located at the trailing edge 110 and fluidly couple the interior 114 of the airfoil 90 to an exterior 115 of the airfoil 90.

In an aspect of the disclosure herein the interior walls 118 can extend in a chord-wise direction separating a first cooling passage 116a from a second cooling passage 116b where the second cooling passage 116b can be located proximate the outer wall 100. In an aspect of the disclosure herein at least one cooling hole 102 can be a set of internal cooling holes 120 extending through the interior wall 118 between the first and second cooling passages 116a, 116b. It is contemplated that a first set of internal cooling holes 120a are substantially straight in order to provide a head on impingement flow (I) (FIG. 4) on the outer wall 100. In other words, because of the orientation of the first set of cooling holes 120 with respect to the outer wall 100 being substantially perpendicular, the geometry of the first set of internal cooling holes 120a enables an effective impingement upon the outer wall 100.

In an aspect of the disclosure herein a second set of internal cooling holes 120b can be provided at a corner 128 of the first cooling passage 116a located at a downstream corner of the first cooling passage 116a with respect to the chord-wise direction. The corner 128 can be defined as a point in the first cooling passage 116a that is closest to the trailing edge 110 and in a cross-sectional view is an apex of the triangular shape formed by the first cooling passage 116a. In other words, the corner 128 can be any location that would make forming a set of internal cooling holes like the set of internal cooling holes 120a difficult to achieve while also enabling effective impingement. To enable the most effective impingement upon the outer wall 100 in as many locations as possible, the second set of internal cooling holes 120b can include a substantially straight portion 129 similar to the first set of internal cooling holes 120a. The second set of internal cooling holes 120b includes a curve 130 between a first portion 132 extending from the corner 128 toward the trailing edge 110 and a second portion 134 extending from the curve 130 toward the second cooling passage 116b and including the substantially straight portion 129.

It is further contemplated that the second cooling passage 116b can define an impingement cavity 136 wherein the first and second set of internal cooling holes 120a, 120b enable cooling fluid (C) within the at least one cooling passage 116 to impinge on the outer wall 100 at an impingement surface 126 upon passing through the set of internal cooling holes 120. It is contemplated that the cooled surface 124 and the impingement surface 126 are the same surface in some aspects of the disclosure herein. By way of non-limiting example, if cooling fluid was also introduced to the second cooling passage 116b. It is further contemplated that impingement can occur upon any surface in need to cooling, and the outer wall 100 is for illustrative purposes and not meant to be limiting.

The at least one cooling hole 102, including the set of internal cooling holes 120 can pass through a substrate, which by way of illustration is internal walls 118. It should be understood, however, that the substrate can be any wall within any component of the engine 10 including but not limited to the outer wall 100, a tip wall, or a combustion liner wall. Materials used to form the substrate include, but are not limited to, steel, refractory metals such as titanium, or superalloys based on nickel, cobalt, or iron, and ceramic matrix composites. The superalloys can include those in equiaxed, directionally solidified, and crystal structures. The substrate can be formed by, in non-limiting examples, 3D printing, investment casting, or stamping.

Figure 4:
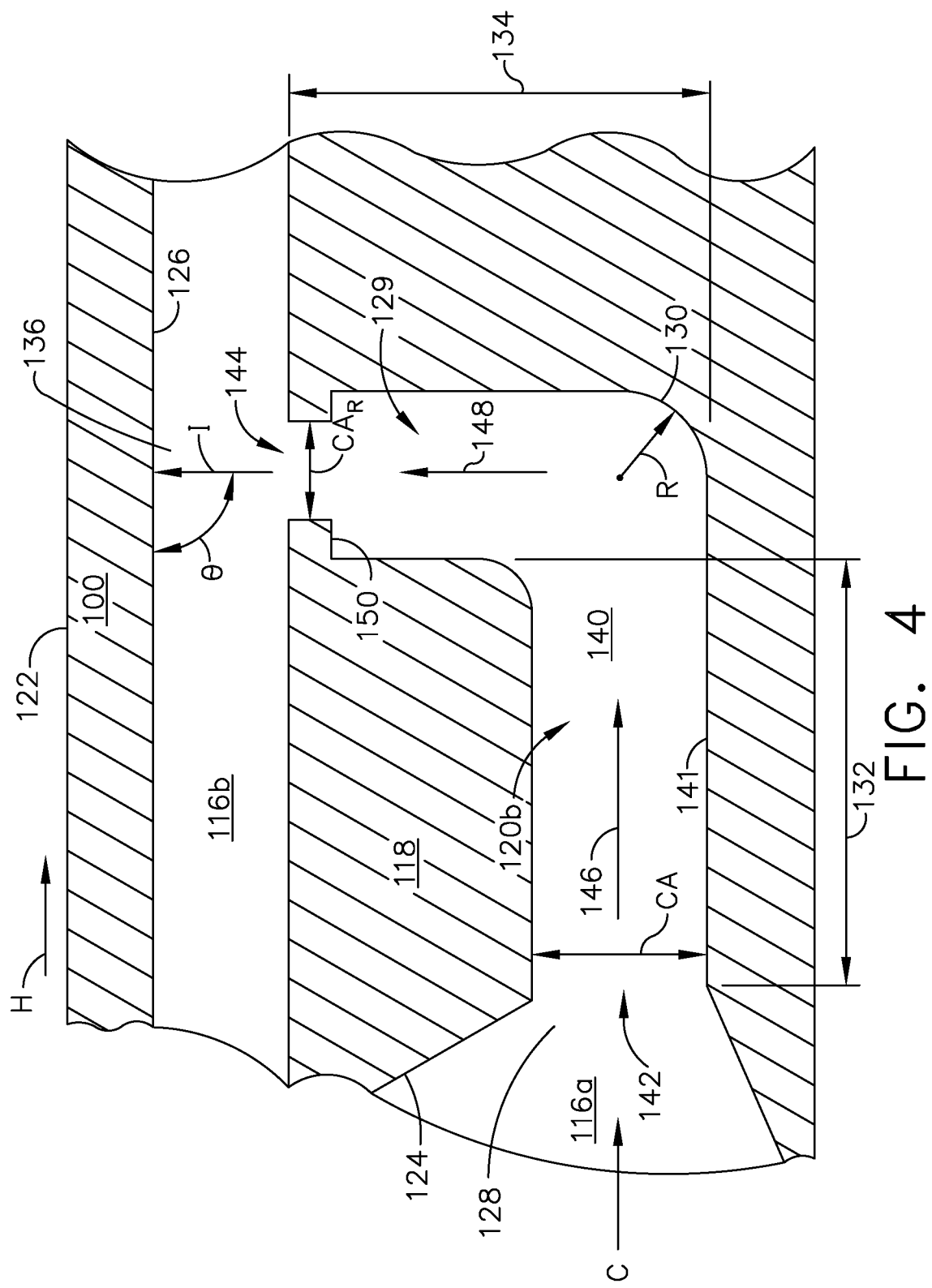
FIG. 4 is an enlarged cross-sectional view of one of the internal cooling holes from FIG. 3 with a connecting passage extending between an inlet and an outlet.
Figure 5A:
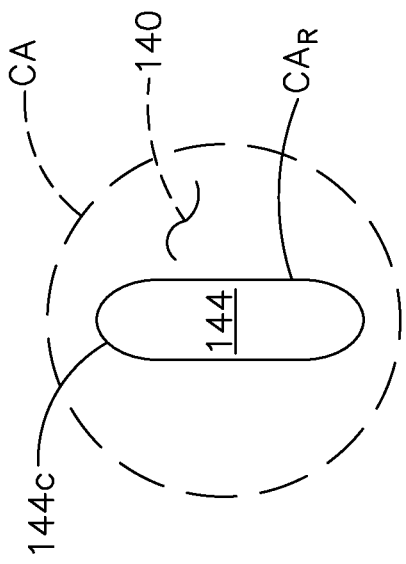
FIG. 5 is a head on view of the outlet with various shapes according to an aspect of the disclosure herein.
Figure 5B:
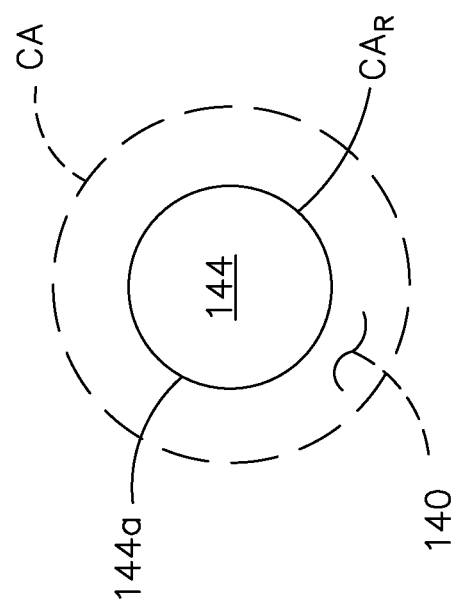
Figure 5C:
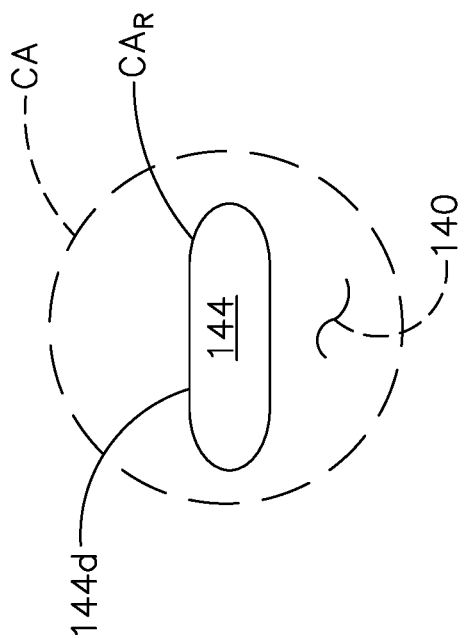
Figure 5D:
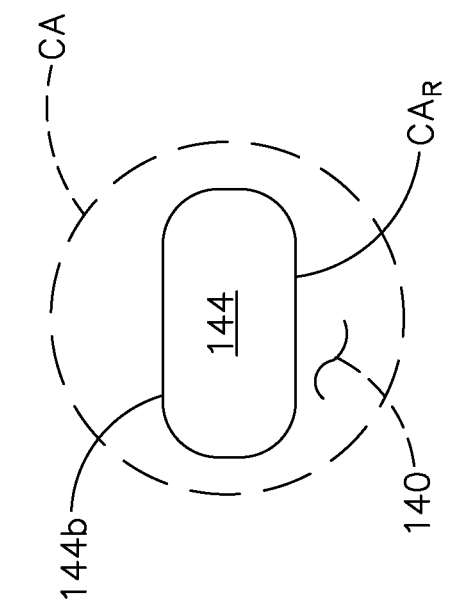

Turning to FIG. 4, it is more clearly seen how the cooling hole 120 supplies an impingement flow (I) of air from the cooling passage 116a onto the outer wall 100, having the heated surface 122, and into the second cooling passage 116b. The internal wall 118 extends between the second cooling passage 116b and the first cooling passage 116a including the cooled surface 124 facing the cooling fluid flow (C). It should be understood that the heated surface 122 and cooled surfaces 124, 126 are relative to each other and can be any range of temperatures during engine operation. The heated surface is at a greater temperature than the cooled surface, even though they both may be at absolute temperatures that are considered hot or high.

It is noted that the outer wall 100 and the interior wall 118 as described herein are shown generally planar, however it is understood that the outer wall 100 and the interior wall 118 can be for curved engine components. The curvature of an engine component in such an example can be slight in comparison to the cooling holes as described herein, and so for purposes of discussion and illustration is shown as planar. Whether the outer wall 118 is planar or curved local to the second set of internal cooling holes 120b, the hot and cooled surfaces 122, 124, 126 can be parallel to each other as shown herein or can lie in non-parallel planes.

The second set of internal cooling holes 120b can include a connecting passage 140 extending between an inlet 142 at the corner 128 and an outlet 144 at the impingement cavity 136. The connecting passage 140 can define a continuous cross-sectional area (CA) of the connecting passage 140 as defined by sidewalls 141. It is contemplated that the continuous cross-sectional area (CA) is a circular shape, but any cross-sectional area is contemplated. The connecting passage 140 extends from the inlet 142 in a first direction 146 toward the curve 130 defining the first portion 132. In one aspect of the disclosure herein the first portion 132 of the connecting passage 140 as illustrated extends substantially parallel to the interior wall 118. It should be understood, however, that the connecting passage can extend in any direction that is at a non-normal angle to cooled surface 126. It is further contemplated that the first direction 146 is the chord-wise direction, but can be the radial direction, or any direction that is out-of-plane with a normal line extending from the cooled surface 126.

The connecting passage 140 extends in a second direction 148 from the curve 130 to the outlet 144 to define the second portion 134. The outlet 144 is oriented to face the impingement surface 126. In an aspect of the disclosure herein it is contemplated that the second direction 148 is substantially perpendicular to the impingement surface 126 as illustrated. By substantially perpendicular an angle θ formed between the first and second directions 146, 148 is between 80 and 100 degrees at the curve 130. The connecting passage 140 can define a radius (R) at the curve 130. In an aspect of the disclosure herein, the radius (R) is a continuous radius as illustrated. It is further contemplated that the radius (R) is discontinuous, or made up of multiple radii together forming the curve 130. In another aspect the radius (R) is a step-wise radius, made up of consecutive radii in steps to form the curve 130. The curve 130 can have non-circular sections that can be higher order polynomials or Bezier curves. It is further contemplated that the curve 130 can be non-planar geometries and is not limited to circular geometries.

A restriction 150 can be provided near or at the outlet 144. In an aspect of the disclosure herein, the restriction 150 is provided at the outlet 144 as illustrated, although it can be located anywhere along the passage. A smaller cross-sectional area (CAR) is formed where the restriction 150 is provided, which will lead to an acceleration of the flow as it exits the passage, thereby increasing the speed of the impingement flow on the surface 126.

FIG. 5 is a collection of outlets from a head on view of the outlet 144 and illustrating the smaller cross-sectional area (CAR) at the outlet 144. The outlet 144 can be a circular shape 144a or a racetrack shape 144b. It is also contemplated that the outlet can be an oblong oval and oriented in a vertical direction 144c or a horizontal direction 144d.

Figure 6:
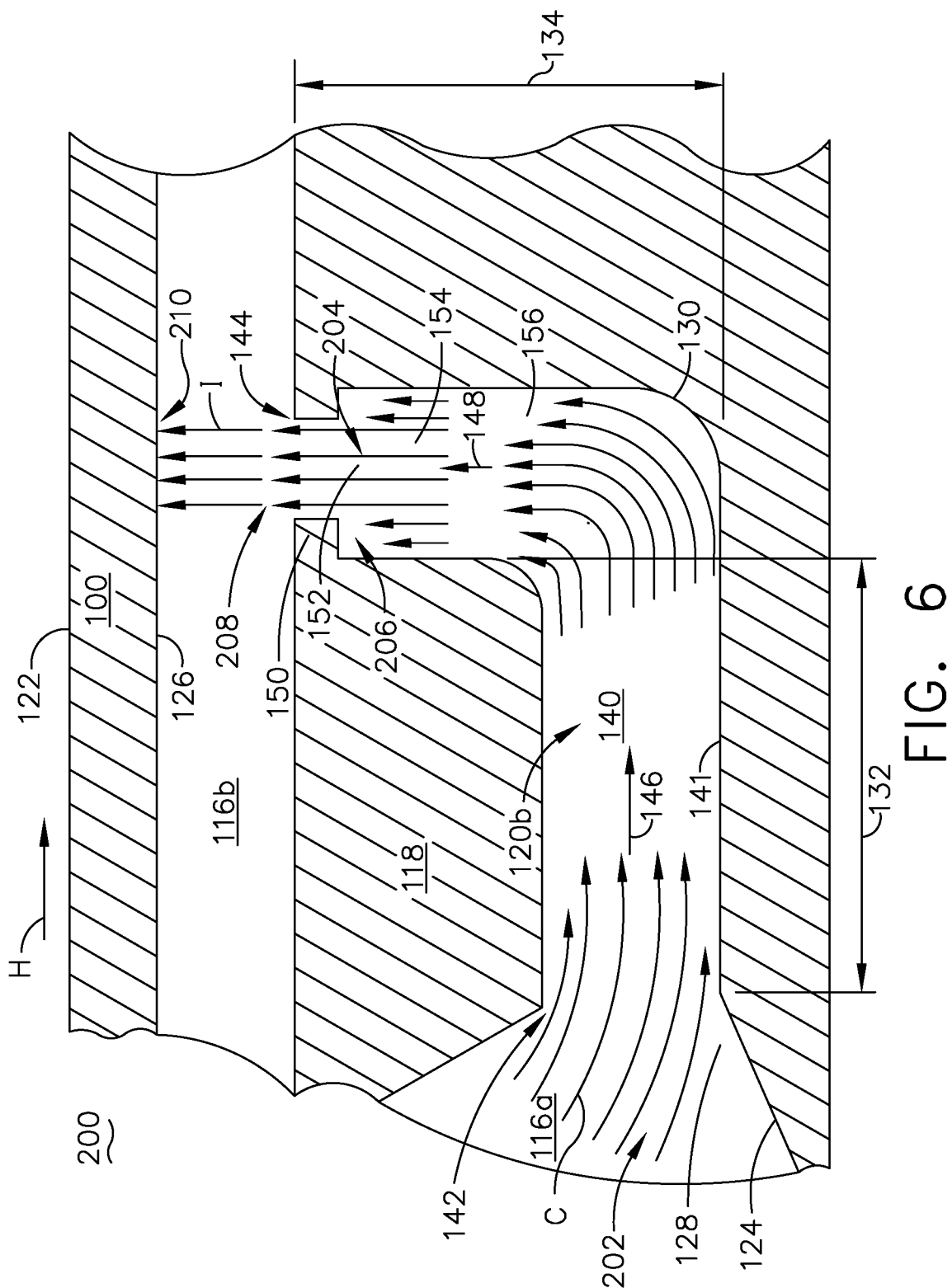
FIG. 6 is the same enlarged view of FIG. 4 illustrating a method of cooling the airfoil of FIG. 2.

Turning to FIG. 6, a method 200 for cooling an engine component with the internal cooling passage 116 and impingement cavity 136 as described herein is illustrated. At 202, fluid, by way of non-limiting example the cooling fluid (C), is flowed through a cooling hole, by way of non-limiting example the set of internal cooling holes 120b. The cooling fluid (C) flows through the connecting passage 140 of the set of internal cooling holes 120b in the first direction 146. The first portion 132 extends in the first direction 146 any required amount to establish the curve 130 in order to establish the optimal second direction 148. In some aspects of the disclosure herein, the length to which the first portion 132 extends produces a larger boundary layer 156 than would be formed in the first set of internal cooling holes 120a as described herein. The cooling fluid (C) is then directed in the second direction 148, which is different from the first direction 146. At 204, the fluid is accelerated as it passes through the set of internal cooling holes 120b. The method can further include a boundary layer restart such that at 206 minimizing the boundary layer 156 of the cooling fluid flow (C) occurs.

The method can include at 208 accelerating the cooling fluid (C) by emitting the cooling fluid (C) through an outlet 144 of the set of internal cooling holes 120b having the restriction 150. The restriction 150 is utilized to lessen or eliminate the undesirable boundary layer 156 that may have been formed while the cooling fluid (C) moved through the first portion 132. The method can also include at 210, impinging the cooling fluid flow (C) on the impingement surface 126 opposite the outlet 144 to define an impingement flow (I). It is desirable for the restriction 150 to be sized such that the highest velocity portion 152 of the cooling fluid flow (C) is captured and forms the impingement flow (I). The most uniform portion 152 is determined with respect to a boundary layer 154 of the cooling fluid flow (C) located along the sidewalls 141 that form the boundary layer 156.

Turning to FIG. 7, an enlarged view of connecting passage 140 at the outlet 144 is depicted to more clearly describe the geometry of the restriction 150. The restriction 150 can be in the form of a blunt portion 164 that extends into the connecting passage 140 from the sidewalls 141 some first dimension 160. This first dimension 160 is determined by the extent of the boundary layer 154 for the connecting passage 140. The blunt portion 164 can extend along the second direction 148 some second dimension 162. It is contemplated that the second dimension 162 is much smaller than the first dimension 160 and in an aspect of the disclosure herein is only enough to define a smaller cross-sectional area (CAR) at the outlet 144. The extent of the second dimension 162 is determined with respect to the rate at which an abrupt change between the cross-sectional area (CA) of the connecting passage 140 and the cross-sectional area (CAR) of the outlet 144 is required.

FIG. 8 illustrates a restriction 250 that can be utilized in airfoil 90 as described herein. The restriction 250 is similar to the restriction 150 therefore, like parts will be described with like numerals increased by 100, with it being understood that the description of the like parts of the restriction 150 applies to the restriction 250, unless otherwise noted.

The restriction 250 can include a tapered portion 264 extending from sidewalls 241 of a connecting passage 240 of a second set of internal cooling holes 220b as described herein. The tapered portion 264 can define a frusto-conical outlet 244 defining a maximum cross-sectional area equal to the cross-sectional area (CA) of the connecting passage 240 and a minimum cross-sectional area equal to a cross-sectional area (CAR) located where the connecting passage 240 meets the second cooling passage 116b. The tapered portion 264 can extend toward a centerline (CL) of the connecting passage 240 at an angle α measured from the sidewalls 241.

While a blunt portion 164 and a tapered portion 264 are illustrated, it should be understood that any geometry can be provided where the cross-sectional area through which the cooling fluid is flowing is suddenly changed. By way of non-limiting example, the tapered portion 264 could have a curve, either concave or convex with respect to the connecting passage 240 to form a smaller cross-sectional area (CAR) as illustrated.

A curved impingement hole enables the cooling fluid flow to be directed normal to the impingement surface. The additional connecting passage length required to turn the cooling fluid flow builds up an undesirable boundary layer which is ameliorated by an abrupt constriction formed at the exit by the restrictions as described herein. Using a curved internal cooling hole allows the cooling designer to optimally impinge normal to an impingement surface. A linear hole could not reach the desired impingement surface in some cases or if reached, the angle of impingement may not be ideal, in other words the angle of impingement would not be as closed to 90 degrees as is desired.

It is known that optimum impingement occurs when the impingement is perpendicular to the impingement surface. Often impingement holes with linear centerlines have geometric constraints that result in less than optimum flow angles. With curved impingement holes, the cooling designer can put the impingement at the optimum orientation.

Turbine cooling is important in next generation architecture which includes ever increasing temperatures. Current cooling technology needs to expand to the continued increase in core temperature of the engine that comes with more efficient engine design. Optimizing cooling at the surface of engine components by designing cooling hole geometry for difficult areas to reach benefits the entire engine.

It should be appreciated that application of the disclosed design is not limited to turbine engines with fan and booster sections, but is applicable to turbojets and turbo engines as well.

This written description uses examples to illustrate the disclosure as discussed herein, including the best mode, and also to enable any person skilled in the art to practice the disclosure as discussed herein, including making and using any devices or systems and performing any incorporated methods. The patentable scope of the disclosure as discussed herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine which generates a hot gas fluid flow and provides a cooling fluid flow, the airfoil comprising:
   an outer wall separating the hot as fluid flow from the cooling fluid flow, bounding an interior, having a heated surface along which the hot gas fluid flow flows and defining a pressure side and a suction side extending between a leading edge and a trailing edge to define a chord-wise direction and extending between a root and a tip to define a span-wise direction;
   a first cooling passage defined at least in part by an interior wall, the first cooling passage extending in the span-wise direction within the interior and defining a corner;
   a second cooling passage located proximate the first cooling passage and defined at least in part by the outer wall;
   the interior wall spaced from the outer wall, boated in the interior, the interior wall defining at least a portion of a cooled surface facing the cooling fluid flow and separating the first cooling passage from the second cooling passage; and
   at least one cooling hole passing through the interior wall and having an inlet at the corner, an outlet at the second cooling passage, and a connecting passage defining a cross-sectional area bound by the interior wall, extending between the inlet and the outlet, and closed by the interior wall between the inlet and the outlet, with the connecting passage having a curved portion where the cross-sectional area defines a curvilinear centerline, the connecting passage defined by at least a first portion extending in a first direction away from the corner, and a second portion extending in a second direction toward the outer wall, the second direction different from the first direction, the first portion connected to the second portion at the curved portion.

2. The airfoil of claim 1, wherein the connecting passage further comprises a restriction such that a cross-sectional area at the restriction is smaller than a cross-sectional area upstream of the restriction.

3. The airfoil of claim 2, wherein the restriction is at the outlet.

4. The airfoil of claim 3, wherein the restriction is defined by the connecting passage having a tapered portion formed at the outlet.

5. The airfoil of claim 3, wherein the restriction is defined by the connecting passage having a blunt portion formed at the outlet.

6. The airfoil of claim 1, wherein the first direction is non-normal to an impingement surface.

7. The airfoil of claim 1, wherein the second direction is substantially perpendicular to an impingement surface.

8. The airfoil of claim 1, wherein the connecting passage defines a radius.

9. The airfoil of claim 1, wherein the outlet opens into the second cooling passage opposite the outer wall.

10. The airfoil of claim 1, wherein the corner is a downstream corner.

11. A component for a turbine engine which generates a hot gas fluid flow, and provides a cooling fluid flow, the component comprising:

an outer wall separating the hot gas fluid flow from the cooling fluid flow, forming an interior, and having a heated surface along which the hot gas fluid flow flows;

an interior wall spaced from the outer wall and defining at least a portion of a cooled surface facing the cooling fluid flow;

a first cooling passage defined at least in part by the interior wall and having a corner;

a second cooling passage located proximate the first cooling passage, defined at least in part by the outer wall and separated from the first cooling passage by the interior wall; and at least one cooling hole passing through the interior wall and having an inlet at the corner, an outlet at the second cooling passage, and a connecting passage defining a cross-sectional area bound by the interior wall, extending between the inlet and the outlet, and closed by the interior wall between the inlet and the outlet, with the connecting passage having a curved portion where the cross-sectional area defines a curvilinear centerline, the connecting passage defined by at least a first portion extending in a first direction away from the corner, and a second portion extending in a second direction toward the outer wall, the second direction different from the first direction, the first portion connected to the second portion at the curved portion.

12. The component of claim 11, wherein the connecting passage further comprises a restriction such that a cross-sectional area at the restriction is smaller than a cross-sectional area upstream of the restriction.

13. The component of claim 12, wherein the restriction is at the outlet.

14. The component of claim 13, wherein the restriction is defined by a tapered portion formed at the outlet.

15. The component of claim 13, wherein the restriction is defined by a blunt portion formed at the outlet.

16. The component of claim 11, wherein the second direction is substantially perpendicular to the first direction.

17. The component of claim 11, wherein the connecting passage defines a radius.

18. The component of claim 11, wherein the second cooling passage includes an impingement surface defined at least in part by the outer wall.

19. The component of claim 18, wherein the impingement surface is located opposite the outlet.

20. The component of claim 19, wherein the second cooling passage is an impingement cavity.

21. A method for cooling the component of claim 11, the method comprising:

flowing a fluid of the cooling fluid flow through the inlet of the at least one cooling hole;

flowing the fluid through the first portion in the first direction;

turning the fluid through the curved portion of the connecting passage;

flowing the fluid through the second portion in the second direction; and accelerating the fluid as it passes through the at least one cooling hole.

22. The method of claim 21, wherein the accelerating the fluid further comprises emitting the fluid through the outlet of the at least one cooling hole, the outlet having a restriction.

23. The method of claim 22, further comprising impinging the fluid on an impingement surface opposite the outlet.

24. The method of claim 21, wherein the accelerating the fluid further comprises minimizing a boundary layer of the fluid.

* * * * *

UNITED STATES PATENT AND TRADEMARK OFFICE
CERTIFICATE OF CORRECTION

| | |
|---|---|
| PATENT NO. | : 11,391,161 B2 |
| APPLICATION NO. | : 16/039646 |
| DATED | : July 19, 2022 |
| INVENTOR(S) | : David Alan Frey and Kirk D. Gallier |

It is certified that error appears in the above-identified patent and that said Letters Patent is hereby corrected as shown below:

In the Claims

Column 10, Claim 1, Line 9, "hot as" should be "hot gas"

Column 10, Claim 1, Line 23, "boated in" should be "located in"

Signed and Sealed this
Fourth Day of April, 2023

Katherine Kelly Vidal
*Director of the United States Patent and Trademark Office*